(12) United States Patent
Uchino et al.

(10) Patent No.: US 8,244,773 B2
(45) Date of Patent: Aug. 14, 2012

(54) KEYWORD OUTPUT APPARATUS AND METHOD

(75) Inventors: Kanji Uchino, Kawasaki (JP); Tetsuro Takahashi, Kawasaki (JP); Seishi Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 306 days.

(21) Appl. No.: 12/613,984

(22) Filed: Nov. 6, 2009

(65) Prior Publication Data

US 2010/0138428 A1    Jun. 3, 2010

Related U.S. Application Data

(63) Continuation of application No. PCT/JP2007/059511, filed on May 8, 2007.

(51) Int. Cl.
*G06F 15/16* (2006.01)
*G06F 17/20* (2006.01)

(52) U.S. Cl. .......................... 707/797; 707/798
(58) Field of Classification Search .................. 707/751, 707/797, 798
See application file for complete search history.

(56) References Cited

U.S. PATENT DOCUMENTS

| 2005/0198068 | A1* | 9/2005 | Mukherjee et al. ......... 707/104.1 |
| 2007/0250500 | A1* | 10/2007 | Ismalon ............................ 707/5 |

FOREIGN PATENT DOCUMENTS

| JP | A 8-314980 | 11/1996 |
| JP | A 8-329106 | 12/1996 |
| JP | A 2002-92017 | 3/2002 |
| JP | A 2004-21763 | 1/2004 |
| JP | A 2004-348637 | 12/2004 |
| JP | A 2005-115686 | 4/2005 |
| JP | 2006-31577 | 2/2006 |
| JP | 2006-92368 | 4/2006 |
| JP | A 2006-164045 | 6/2006 |
| JP | A 2006-216022 | 8/2006 |
| JP | A 2007-219880 | 8/2007 |

OTHER PUBLICATIONS

Konomu Dobashi, "Interactive Visualization of Problem Structure Integrated with WWW and Text Mining," IEICE Technical Report, vol. 99, No. 447, Nov. 1999, pp. 51-58.
Noriaki Kawamae, et al., "The search system of utilizing users' search history," Information Processing Society of Japan Kenkyu Hokoku, vol. 2000, No. 69, Jul. 26, 2000, pp. 113 to 120. Kazuo Misue, et al., "Visualization of Keyword Association for Text Mining," Information Processing Society of Japan Kenkyu Hokoku, vol. 99, No. 57, Jul. 16, 1999, pp. 65 to 72.
Atsushi Fujii, et al., "Web Mining for Compiling and Accessing Encyclopedic Contents," IEICE Technical Report, vol. 104, No. 102, Jun. 2004, pp. 31 to 36.

* cited by examiner

*Primary Examiner* — Jean M Corrielus
*Assistant Examiner* — Alex Gofman
(74) *Attorney, Agent, or Firm* — Fujitsu Patent Center

(57) ABSTRACT

Related keywords having certain relations to a target keyword are extracted from a unit storing keywords according to relations among each other. Expressions corresponding to the target keyword and related keywords are read from a unit storing expressions correspondingly with each stored keyword, each expression having been extracted from a content containing the corresponding keyword. A commonness between the expressions corresponding to each related keyword and the target keyword is calculated. An association between each related keyword and the target keyword is calculated using a distance for each related keyword from the target keyword and the commonness. A related keyword having a certain association is extracted as a same-region keyword in a same region as the target keyword. A drawing including the target keyword and related keywords arranged according to the associations is output with the same-region keyword displayed distinguishably from other related keywords not included in the same region.

7 Claims, 16 Drawing Sheets

FIG.5

| TARGET KEYWORD | EVALUATION EXPRESSION 1 | EVALUATION EXPRESSION 2 | ... | EVALUATION EXPRESSION n |
|---|---|---|---|---|
| COMPANY A | SECURE (0.5) | SAFE (0.7) | ... | INEXPENSIVE (0.5) |
| COMPANY E | SAFE (0.7) | STRONG (0.3) | ... | EXPENSIVE (0.2) |
| ⋮ | ⋮ | ⋮ | ⋮ | ⋮ |

| TARGET KEYWORD | CO-OCCURRING WORD 1 | CO-OCCURRING WORD 2 | ... | CO-OCCURRING WORD n |
|---|---|---|---|---|
| COMPANY A | PERSONAL COMPUTER (50) | COMPANY B (70) | ... | COMMUNICATIONS (30) |
| COMPANY E | AUTOMOBILE (70) | ENVIRONMENT (30) | ... | EXPORT (20) |
| ⋮ | ⋮ | ⋮ | ⋮ | ⋮ |

| Stp | COMPANY A | COMPANY B | COMPANY C | ... |
|---|---|---|---|---|
| COMPANY A | - | 1 | 2 | ... |
| COMPANY B | - | - | 3 | ... |
| COMPANY C | - | - | - | ... |
| ⋮ | ⋮ | ⋮ | ⋮ | ⋮ |

| CoEv | COMPANY A | COMPANY B | COMPANY C | ... |
|---|---|---|---|---|
| COMPANY A | - | 10 | 14 | ... |
| COMPANY B | - | - | 5 | ... |
| COMPANY C | - | - | - | ... |
| ⋮ | ⋮ | ⋮ | ⋮ | ⋮ |

FIG.9

| CoOc | COMPANY A | COMPANY B | COMPANY C | ... |
|---|---|---|---|---|
| COMPANY A | - | 5.3 | 1.5 | ... |
| COMPANY B | - | - | 0.5 | ... |
| COMPANY C | - | - | - | ... |
| ⋮ | ⋮ | ⋮ | ⋮ | ⋮ |

| TARGET KEYWORD | RELATED KEYWORD | EDGE | DEGREE OF ASSOCIATION | SAME-REGION FLAG |
|---|---|---|---|---|
| A | B | A, C ... | 53 | 1 |
|  | C | A, B, D ... | 10.5 | 1 |
|  | ⋮ | ⋮ | ⋮ | ⋮ |

14i

KEYWORD OUTPUT APPARATUS AND METHOD

CROSS-REFERENCE TO RELATED APPLICATION(S)

This application is a continuation of International Application No. PCT/JP2007/059511, filed on May 8, 2007, the entire contents of which are incorporated herein by reference.

FIELD

The embodiments discussed herein are directed to a keyword output apparatus and a keyword output method for outputting through an output unit a keyword layout drawing including a plurality of keywords arranged according to degrees of association among the keywords.

BACKGROUND

Techniques have been proposed for providing a network representation of a plurality of related keywords for a topic generated on the Internet or on an intranet. For example, a plurality of keywords co-occurring in a plurality of blogs may be extracted to provide a network representation thereof. Further, keywords close to a keyword specified by a user may be extracted to visualize a relationship among topical keywords. Furthermore, a user may specify a plurality of keywords and reputations related the keywords may be extracted to visualize a relationship among the keywords.

In another field, for example, as disclosed in Japanese Laid-open Patent Publication No. 2006-031577, an information search overlooking device performs a process of displaying a bird's eye view by extracting text information from information to be searched through, performing indexing of the extracted information, searching for pieces of information matching a search keyword given for a search input from a user, and arranging them at predetermined positions reflecting the degrees of matching between the matched pieces information and the search keyword and the relativity among the pieces of information to visualize them.

However, with the above conventional techniques, an overlook of the whole relation cannot be achieved. More specifically, with the technique of extracting keywords co-occurring in a plurality of blogs and providing a network presentation of the keywords, boundaries among the keywords cannot be clearly known because many networks having a lot of noise and no meaning with respect to a keyword specified by a user are included. With the technique of extracting keywords close to a keyword specified by a user to visualize a relationship among the keywords, a partial overlook of a portion of a business circle regarding a keyword specified by a user is possible but a whole overlook of the business circle is not possible. With the technique of specifying by a user a plurality of keywords and extracting reputations about the keywords to visualize a relationship among the keywords, the user has to specify a plurality of targets upon overlooking a business circle regarding the plurality of keywords. Therefore, the user has to have knowledge about the business circle and thus is unable to overlook the whole business circle. Similarly, with the technique disclosed in Japanese Laid-open Patent Publication No. 2006-031577, an overlook of the whole cannot be achieved.

SUMMARY

According to an aspect of an embodiment of the invention, a computer readable storage medium having stored therein a keyword output program causing a computer to execute a keyword output method includes: receiving a target keyword from a predetermined input unit; extracting, from a keyword storage unit that stores a plurality of keywords in association with each other according to degrees of relation among each other, a plurality of related keywords that have degrees of relation equal to or greater than a predetermined degree of relation with respect to the target keyword received, the stored plurality of keywords having been used for a search at a search site for searching contents; reading evaluation expressions corresponding to the target keyword and the plurality of related keywords from an evaluation expression storage unit that stores evaluation expressions correspondingly with each of the plurality of keywords stored in the keyword storage unit, each evaluation expression having been extracted from a content containing the corresponding keyword, and calculating for each of the plurality of related keywords a commonness degree between the evaluation expressions corresponding to the related keyword and the evaluation expressions corresponding to the target keyword; calculating for each of the plurality of related keywords a degree of association between the related keyword and the target keyword by using a distance derived from the keyword storage unit for each of the plurality of related keywords with respect to the target keyword and the commonness degree of the evaluation expressions calculated for each of the plurality of related keywords; determining whether the degree of association calculated is greater than a predetermined degree of association and extracting at least one of the plurality of related keywords having a degree of association greater than the predetermined degree of association as a same-region keyword included in a same region as the target keyword; and outputting a keyword layout drawing including the target keyword and the plurality of related keywords arranged according to the degrees of association between each other through a predetermined output unit such that the same-region keyword is displayed distinguishably from other related keyword or keywords not included in the same region.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is a diagram of an example of an evaluation expression DB;

FIG. 6 is a diagram of an example of a co-occurring word DB;

FIG. 7 is a diagram of an example of a step number DB;

FIG. 8 is a diagram of an example of an evaluation expression commonness degree DB;

FIG. 9 is a diagram of an example of a co-occurrence degree DB;

FIG. 10 is a diagram of an example of a keyword layout drawing DB;

DESCRIPTION OF EMBODIMENT(S)

Preferred embodiments of the present invention will be explained with reference to accompanying drawings.

First, an outline and features of the keyword output apparatus according to a first embodiment of the present invention are described below. Next, a configuration and a flow of processes performed by the keyword output apparatus are described. Then, effects of the first embodiment are described.

[a] First Embodiment

Outline and Features of the Keyword Output Apparatus

Figure 1:
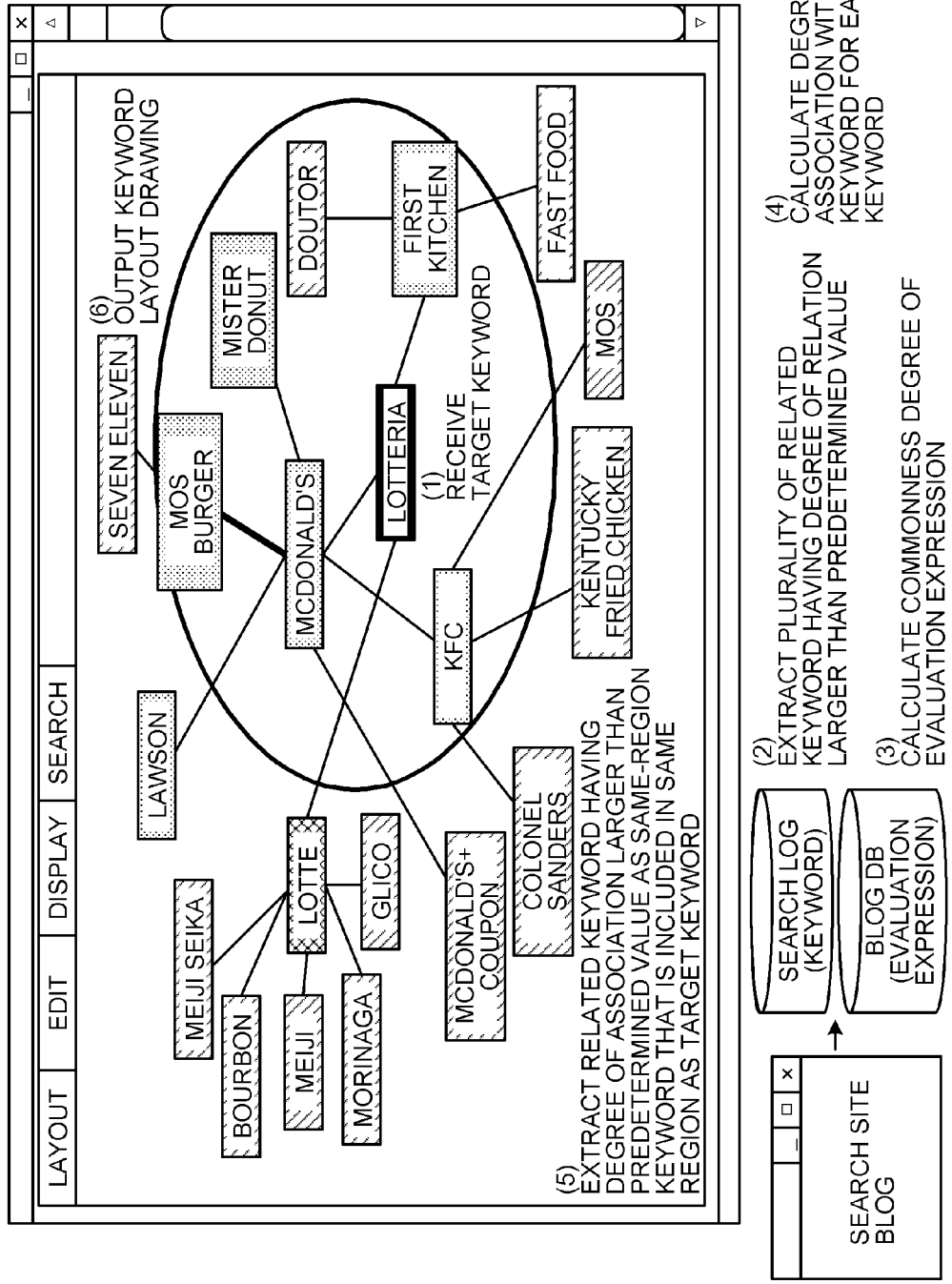
FIG. 1 is a schematic diagram of features of a keyword output apparatus according to a first embodiment of the present invention.

First, an outline and features of a keyword output apparatus according to a first embodiment of the present invention are described with reference to FIG. 1. FIG. 1 is a schematic diagram of features of the keyword output apparatus according to the first embodiment.

As illustrated in FIG. 1, the keyword output apparatus outputs through a predetermined output unit a keyword layout drawing in which a plurality of keywords are laid out according to degrees of association among the keywords. The keyword output apparatus has, as one of its main features, a feature of allowing a bird's eye view of an overall relationship by clarifying, upon providing a network representation of the plurality of keywords related to each other, an accurate boundary defined by a user's evaluating viewpoint from a target keyword.

More specifically, the keyword output apparatus stores therein a plurality of keywords that have been used for a search at a search site for searching contents so that the keywords are stored in association with each other according to degrees of relation among the keywords. Each of the stored keywords is stored correspondingly with evaluation expressions corresponding to the keyword that are extracted from blog articles including the keyword. Each of the keywords is stored correspondingly with numbers of co-occurring articles with respect to other keywords each appearing as a co-occurring word in a same blog article with the keyword.

The keyword output apparatus receives from a predetermined input unit a keyword determined by the user as a target keyword (see (1) in FIG. 1) and then, extracts a plurality of related keywords that have degrees of relation of a predetermined value or more with respect to the received target keyword from the keywords stored therein (see (2) in FIG. 1).

Then, the keyword output apparatus calculates a distance from the target keyword for each of the related keywords extracted. The keyword output apparatus reads, from the evaluation expressions stored, evaluation expressions for the received target keyword and the related keywords, and calculates for each of the extracted related keywords a commonness degree of the evaluation expressions between the extracted related keyword and the target keyword (see (3) in FIG. 1). Then, the keyword output apparatus calculates, from the stored co-occurring keywords and numbers of co-occurring articles, a co-occurrence degree for each extracted related keyword. The co-occurrence degree indicates a proportion of the related keyword appearing with the target keyword in the same blog article as the target keyword.

The keyword output apparatus calculates a degree of association for each of the related keywords with respect to the target keyword by using the distance the commonness degree of the evaluation expressions, and the co-occurrence degree indicating the proportion of appearing in the same blog article, which have been calculated for each related keyword (see (4) in FIG. 1).

The keyword output apparatus determines whether the degree of association is larger than a predetermined value, and extracts a related keyword having a degree of association larger than the predetermined value as a same-region keyword that is included in a same region as the target keyword (see (5) in FIG. 1). The keyword output apparatus outputs to a predetermined output unit a keyword layout drawing in which the target keyword and the related keywords are arranged according to the degrees of association between each other so that the extracted same-region keywords are distinguished from the related keywords that are not included in the same region (see (6) in FIG. 1).

Thus, as described with respect to the one of the main features, when the keyword output apparatus according to the first embodiment provides a network presentation of a plurality of keywords related to each other, an accurate boundary that is defined by an evaluation viewpoint of a user is clarified to provide a bird's eye view of the whole relationship.

Configuration of the Keyword Output Apparatus

Figure 2:
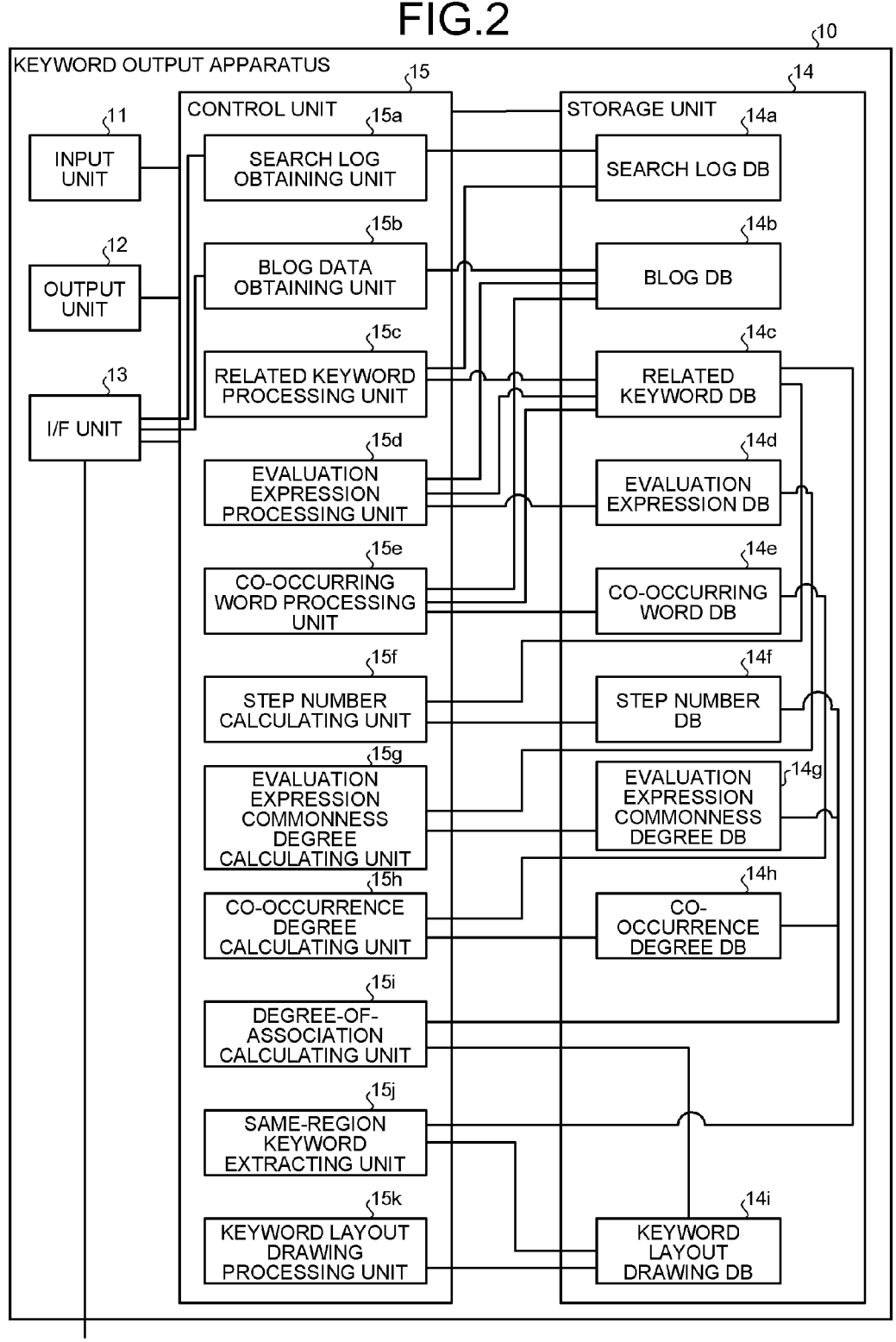
FIG. 2 is a block diagram of a configuration of the keyword output apparatus.

A block diagram of a configuration of the keyword output apparatus illustrated in FIG. 1 is described below with reference to FIG. 2. FIG. 2 is the block diagram of the configuration of the keyword output apparatus. As illustrated in FIG. 2, a keyword output apparatus 10 includes an input unit 11, an output unit 12, an I/F unit 13, a storage unit 14, and a control unit 15.

The input unit 11 receives inputs of various pieces of information, and includes a keyboard and a mouse. The input unit 11 inputs, for example, a target keyword determined by the user.

The output unit 12 outputs various pieces of information, and includes a monitor (or a display or a touch panel) and a speaker. The output unit 12 displays as an output, for example, a keyword layout drawing in which a target keyword and a plurality of related keywords are arranged according to degrees of association between each other.

The I/F unit 13 is connected to a network, and controls communications of various pieces of information obtained via the network. The I/F unit 13 inputs data obtained from, for example, a search site for searching contents and a blog article. The data input is stored in the storage unit 14.

The storage unit 14 stores therein data to be used for various processes performed by the control unit 15 and results of various processes performed by the control unit 15, and includes a search log DB 14a, a blog DB 14b, a related keyword DB 14c, an evaluation expression DB 14d, a co-occurring word DB 14e, a step number DB 14f, an evaluation expression commonness degree DB 14g, a co-occurrence degree DB 14h, and a keyword layout drawing DB 14i as components closely related to the present invention.

Figure 3:
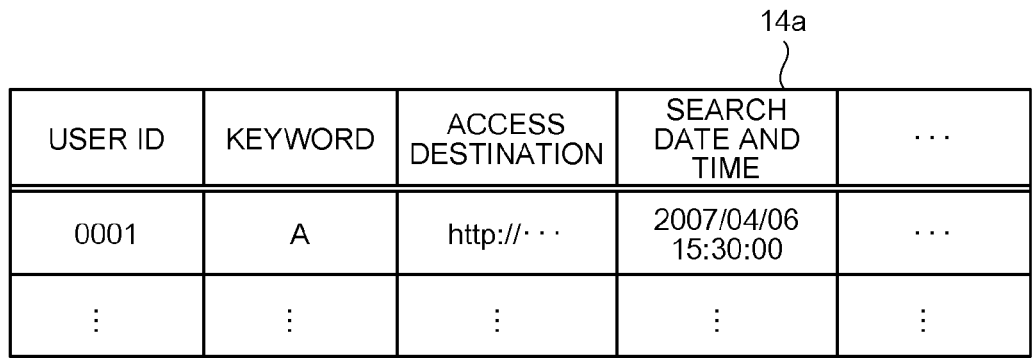
FIG. 3 is a diagram of an example of a search log DB.

The search log DB 14a stores therein a search log obtained for each search performed by a search site for searching contents. More specifically, as illustrated in FIG. 3, the search log DB 14a stores therein information such as user IDs, which that are identification information of users who use the search site, keywords which are search keywords used by the users in the search site to access certain contents, access destinations, which indicate information of the accessed contents, and search dates and times, which are dates and times on and at which the searches were performed by the users in the search site. These pieces of information are stored correspondingly with each other. FIG. 3 is a diagram of an example of the search log DB 14a illustrated in FIG. 2.

The blog DB 14b stores therein data of "blogs" that are Web sites in a form of, for example, diaries updated on a daily basis and managed by individuals or groups of people. The blog DB 14b stores therein, for example, keywords and frank evaluation expressions about various topics extracted from a plurality of blogs managed by individuals or experts.

Figure 4:
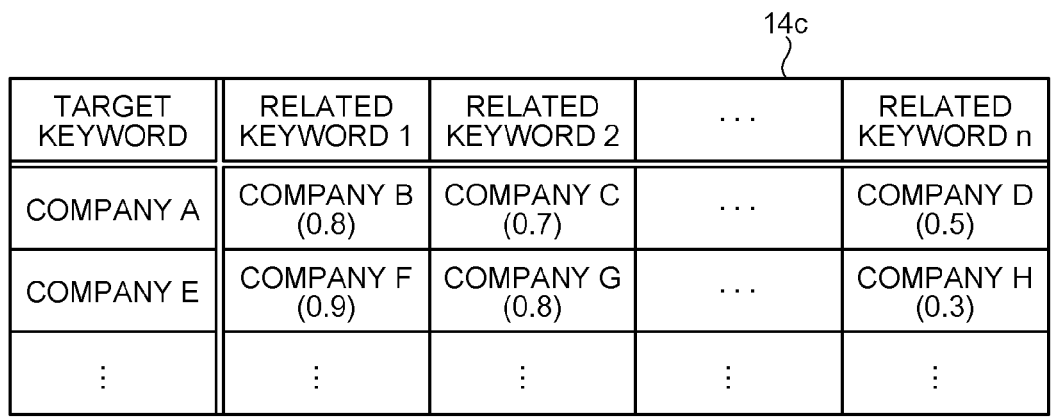
FIG. 4 is a diagram of an example of a related keyword DB.

The related keyword DB 14c stores therein a plurality of keywords used in a search at a search site for searching contents. The keywords are stored in association with each other according to degrees of relation among each other. More specifically, as illustrated in FIG. 4, the related keyword DB 14c stores therein a plurality of related keywords with degrees of relation (in brackets in FIG. 4) with respect to each target keyword that may become a target by a user. FIG. 4 is a diagram of an example of the related keyword DB 14c illustrated in FIG. 2.

The evaluation expression DB 14d stores therein evaluation expressions for each of the keywords stored in the related keyword DB 14c that are extracted from blog articles including the keyword. These evaluation expressions are stored correspondingly with the each of the keywords. More specifically, as illustrated in FIG. 5, the evaluation expression DB 14d stores therein evaluation expressions related to each of the target keywords that may become a target by a user and degrees of relation (in brackets in FIG. 5) with respect to the target keyword, for each of the target keywords. FIG. 5 is a diagram of an example of the evaluation expression DB 14d illustrated in FIG. 2.

The co-occurring word DB 14e stores therein, for each of the plurality of keywords stored in the relate keyword DB 14c, other keywords that appear as co-occurring words in same blog articles as the keyword correspondingly with numbers of these co-occurring articles. More specifically, as illustrated in FIG. 6, the co-occurring word DB 14e stores therein, for each target keyword that may become a target of by a user, co-occurring words (other keywords) that co-occur with the target keyword and the number of times the co-occurring words appear with the target keywords (in brackets in FIG. 6). FIG. 6 is a diagram of an example of the co-occurring word DB 14e illustrated in FIG. 2.

The step number DB 14f stores therein distances (that is, the number of steps) from the target keyword that are derived for each of the keywords stored in the related keyword DB 14c. More specifically, as illustrated in FIG. 7, the step number DB 14f stores therein the number of steps from each of the related keywords (Company A, Company B, Company C, . . . ) to each of the target keywords (Company A, Company B, Company C, . . . ). Here, the number of steps indicates how many steps there are from the target keyword to the related keyword when the related keywords are sorted according to degrees of relation with the target keyword. FIG. 7 is a diagram of an example of the step number DB 14f illustrated in FIG. 2.

The evaluation expression commonness degree DB 14g stores therein, for each of the keywords stored in the related keyword DB 14c, a commonness degree of evaluation expression between the target keywords and the keyword. More specifically, as illustrated in FIG. 8, the evaluation expression commonness degree DB 14g stores therein, for each of the target keywords (Company A, Company B, Company C, . . . ), evaluation expression commonness degrees (CoEv) between the target keyword and each of the related keywords (Company A, Company B, Company C, . . . ). FIG. 8 is a diagram of an example of the evaluation expression commonness degree DB 14g illustrated in FIG. 2.

The co-occurrence degree DB 14h stores therein, for each of the keywords stored in the related keyword DB 14c, co-occurrence degrees that indicates a proportion of the keyword and each of the target keywords appearing in the same blog article. More specifically, as illustrated in FIG. 9, the co-occurrence degree DB 14h stores therein, for each of the target keywords (Company A, Company B, Company C, . . . ), co-occurrence degrees (CoOc) of the keyword and each of the related keywords (Company A, Company B, Company C, . . . ). FIG. 9 is a diagram of an example of the co-occurrence degree DB illustrated in FIG. 2.

The keyword layout drawing DB 14i stores therein, for each of the target keywords, related keywords, edges, degrees of association, and same-region flags. More specifically, as illustrated in FIG. 10, the keyword layout drawing DB 14i stores therein, for each of the target keywords and correspondingly with the related keywords, edges indicating other keywords connected by lines to each related keyword, a degree of association between the target keyword and the related keyword, and a same-region flag indicating whether the target keyword and the related keyword are included in the same region according to the degree of association between the target keyword and the related keyword (if the target keyword and the related keyword are included in the same region, the same-region flag is set to "1", and if the target keyword and the related keyword are not included in the same region, the same-region flag is set to "0"). As the edges, one or more of the connecting sources and the connecting destinations with respect to the related keyword are stored. In FIG. 10, a related keyword B is connected to related keywords A and C as edges. FIG. 10 is a diagram of an example of the keyword layout drawing DB 14i illustrated in FIG. 2.

The control unit 15 includes an internal memory storing control programs such as an operating system (OS), computer programs that prescribe various processing procedures, and to-be-used data with which various processes are performed. More specifically, the control unit 15 includes a search log obtaining unit 15a, a blog data obtaining unit 15b, a related keyword processing unit 15c, an evaluation expression processing unit 15d, a co-occurring word processing unit 15e, a step number calculating unit 15f, an evaluation expression commonness degree calculating unit 15g, a co-occurrence degree calculating unit 15h, a degree-of-association calculating unit 15i, a same-region keyword extracting unit 15j, and a keyword layout drawing processing unit 15k as components closely related to the present invention.

The search log obtaining unit 15a obtains a log as an access result for each search from a search site for searching contents, and stores the log in the search log DB 14a. More specifically, the search log obtaining unit 15a obtains a user ID of a user who accessed a content, a keyword that was input by the user upon searching for the content, an access destination that was accessed by the user, and a search date and time at which the user searched for the content and then, stores this search log obtained in the search log DB 14a.

The blog data obtaining unit 15b obtains data of "blogs" that are Web sites in a form of, for example, diaries updated on a daily basis and managed by individuals or groups of people and then, stores the data in the blog DB 14b. More specifically, the blog data obtaining unit 15b obtains keywords and frank evaluation expression about various topics from blogs managed by individuals and experts, and stores the keywords and the evaluation expressions obtained in the blog DB 14b.

The related keyword processing unit 15c extracts a plurality of keywords used in searches at a search site for retrieving contents, the keywords, calculates degrees of relation between the keywords, and stores the keywords in association with the degrees of relation in the related keyword DB 14c. More specifically, the related keyword processing unit 15c extracts target keywords that may become targets by a user from the keywords stored in the search log DB 14a, calculates degrees of relation between the extracted keywords, selects a plurality of related keywords for each target keyword that have degrees of relation equal to or more than a predetermined value with respect to the target keyword, and then, stores the related keywords in the related keyword DB 14c. For the extraction of the target keywords uses a keyword cluster described later is used.

The evaluation expression processing unit 15d extracts, for each of the keywords stored in the related keyword DB 14c, evaluation expressions about the keywords from blog articles containing the keyword, and stores the evaluation expressions in the evaluation expression DB 14d. More specifically, the evaluation expression processing unit 15d reads the keywords stored in the related keyword DB 14c, extracts evaluation expressions that are stored in the blog DB 14b about the keywords, calculates degrees of relation of the evaluation expressions with respect to the target keywords, and stores the degrees of relation between the target keywords and the evaluation expressions in the evaluation expression DB 14d.

The co-occurring word processing unit 15e stores in the co-occurring word DB 14e, for each of the keywords stored in the related keyword DB 14c, other keywords that appear as co-occurring words in a same blog article as the keyword correspondingly with the numbers of these co-occurring articles. More specifically, the co-occurring word processing unit 15e reads the keywords stored in the related keyword DB 14c, extracts other keywords that appear with the keywords stored in the blog DB 14b as co-occurring words, calculates the numbers of articles in which the extracted keywords appear, and stores in the co-occurring word DB 14e the co-occurring words correspondingly with the numbers of these co-occurring articles, for each of the target keywords.

The step number calculating unit 15f calculates, for each of the related keywords that have degrees of relation equal to or greater than a predetermined value, a distance (that is, the number of steps) between the related keyword and the target keyword, and stores the distances in the step number DB 14f. More specifically, the step number calculating unit 15f calculates the number of steps from the target keywords stored in the related keyword DB 14c to reach the related keywords, and stores the number of steps calculated for each of the keywords in the step number DB 14f.

The evaluation expression commonness degree calculating unit 15g calculates, for each of the related keywords, commonness degrees of the evaluation expressions between the target keyword and the related keyword, and stores the commonness degrees in the evaluation expression commonness degree DB 14g. More specifically, the evaluation expression commonness degree calculating unit 15g calculates the number of evaluation expressions commonly included in the keywords stored in the evaluation expression DB 14d, and stores the number of evaluation expressions calculated in the evaluation expression commonness degree DB 14g.

The co-occurrence degree calculating unit 15h calculates, for each of the related keywords, a co-occurrence degree indicating a proportion of the related keyword appearing in the same blog article as the target keyword, and stores the co-occurrence degree in the co-occurrence degree DB 14h. More specifically, the co-occurrence degree calculating unit 15h calculates a proportion of the keywords stored in the co-occurring word DB 14e appearing in the same blog article, from the number of appearances for which the keywords are included in the same blog article, and stores the co-occurrence degrees calculated in the co-occurrence degree DB 14h.

The degree of association calculating unit 15i calculates, for each of the related keywords, a degree of association between the related keyword and the target keyword by using the distance (the number of steps), the commonness degrees of evaluation expressions, and the co-occurrence degree, which have been calculated for each of the related keywords, and stores the degrees of association in the keyword layout drawing DB 14i. More specifically, the degree-of-association calculating unit 15i calculates the degrees of association by using the step number DB 14f, the evaluation expression commonness degree DB 14g, and the co-occurrence degree DB 14h, and stores the degrees of association in the keyword layout drawing DB 14i. For example, the following equation may be used for calculating the degree of association.

(Degree of Association)=(Number of Evaluation Expressions)×(Proportion of Keywords Being Included in Same Article)÷(Number of Steps)

The same-region keyword extracting unit 15j determines whether a degree of association calculated by the degree-of-association calculating unit 15i is larger than a predetermined value, and stores a related keyword having a degree of association larger than the predetermined value in the keyword layout drawing DB 14i as a same-region keyword included in a same region as the target keyword. More specifically, the same-region keyword extracting unit 15j determines whether a degree of association is larger than a predetermined value. The same-region keyword extracting unit 15j then stores the related keywords in the keyword layout drawing DB 14i, setting a flag at "1" for a related keyword included in the same region, and a flag at "0" for a related keyword not included in the same region.

The keyword layout drawing processing unit 15k outputs to a predetermined output unit a keyword layout drawing in which the target keywords and the related keywords are arranged according to degrees of association between each other so that the same-region keywords are distinguished from the related keywords that are not included in the same region. More specifically, the keyword layout drawing processing unit 15k outputs to a predetermined output unit a keyword layout drawing by drawing a boundary line surrounding the same-region keywords, using different colors and shapes for different keywords, changing the widths of edges between keywords according to degrees of association to make the boundary clear.

Figure 11:
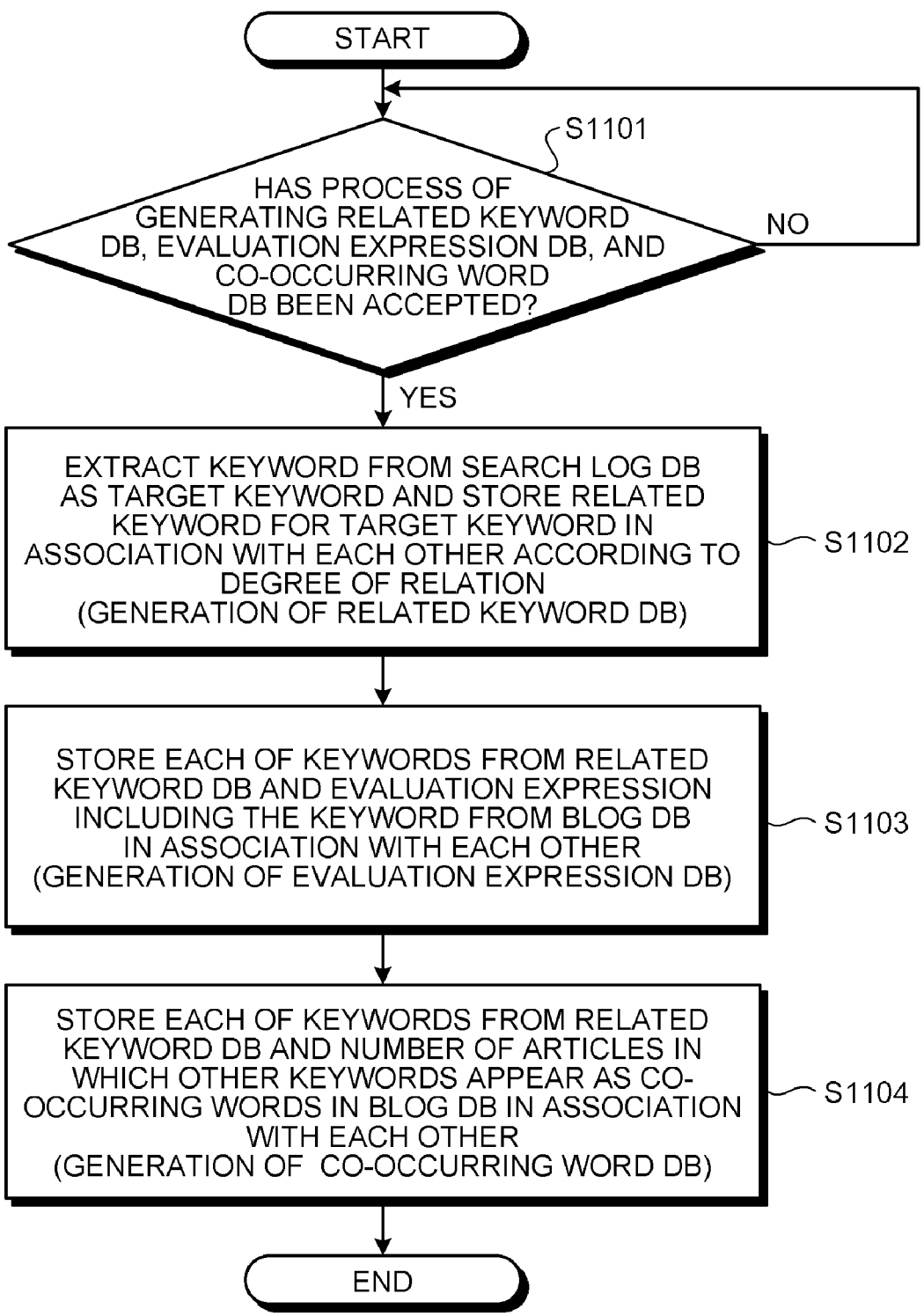
FIG. 11 is a flowchart for generation of the related keyword DB, the evaluation expression DB, and the co-occurring word DB performed by the keyword output apparatus.

Generation of Related Keyword DB, Evaluation Expression DB, and Co-Occurring Word DB A process of generating the related keyword DB 14c, the evaluation expression DB 14d, and the co-occurring word DB 14e performed by the keyword output apparatus 10 are described below with reference to FIG. 11. FIG. 11 is a flowchart for the process of generating the related keyword DB 14c, the evaluation expression DB 14d, and the co-occurring word DB 14e performed by the keyword output apparatus 10.

As illustrated in FIG. 11, the keyword output apparatus 10 determines whether the keyword output apparatus 10 has accepted the process of generating the related keyword DB 14c, the evaluation expression DB 14d, and the co-occurring word DB 14e (Step S1101). If the keyword output apparatus 10 has accepted the process of generating the DBs (YES at Step S1101), the related keyword processing unit 15c of the keyword output apparatus 10 extracts a keyword stored in the search log DB 14a as a target keyword, calculates degrees of relation between the target keyword and related keywords related to the target keyword, and stores the related keywords related to the target keyword in the related keyword DB 14c in association with the target keyword according to degrees of relation between each other (Step S1102).

Figure 12:
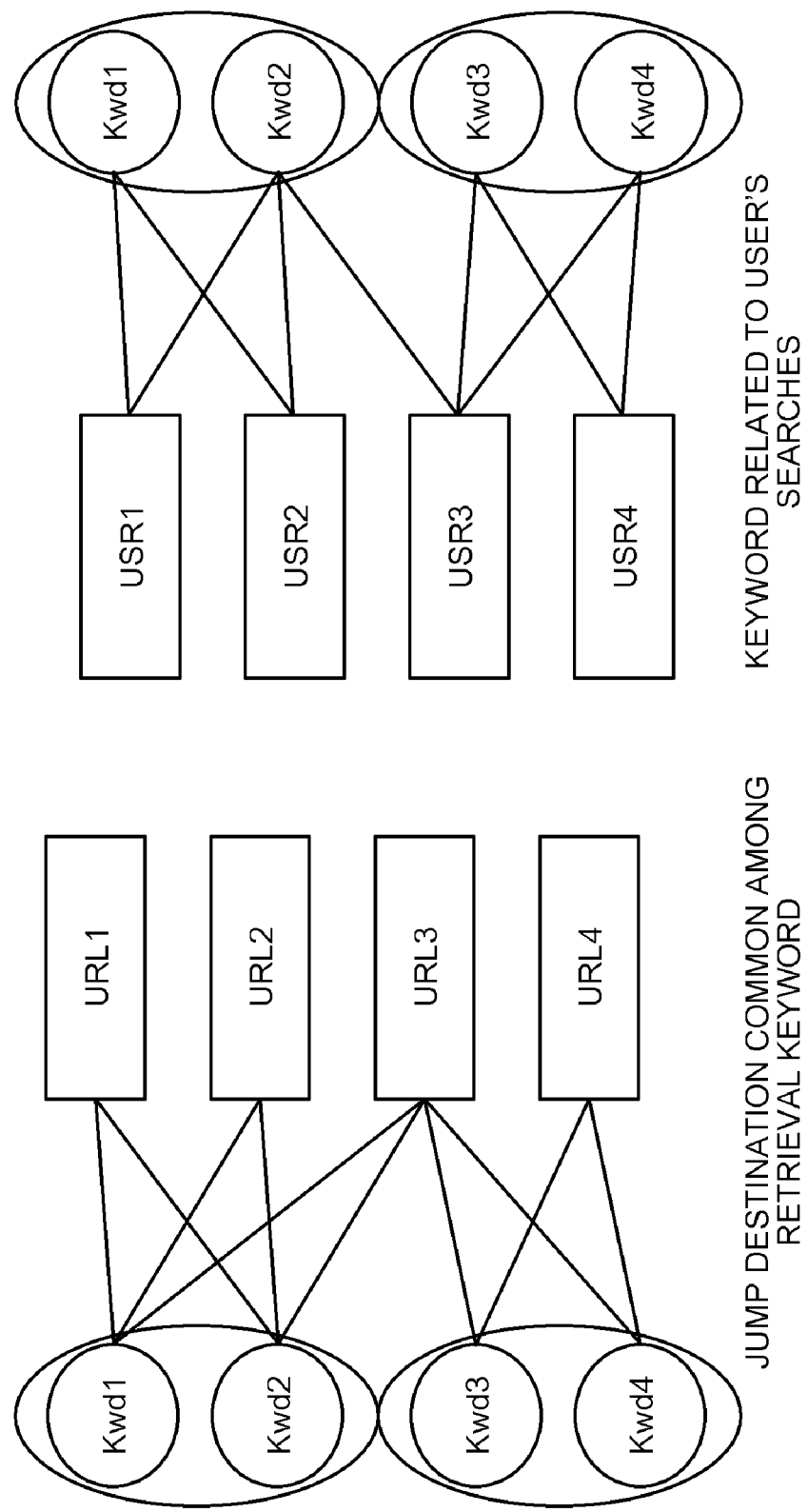
FIG. 12 is a diagram for explaining a keyword cluster preparing procedure performed by the keyword output apparatus.

More specifically, as illustrated in FIG. 12, for example, if keywords "Kwd 1" and "Kwd 2" are input to the keyword output apparatus 10 and a content "URL 1" is accessed, the keywords "Kwd 1" and "Kwd 2" are brought together to form a keyword cluster because a jump destination (that is, access destination) is common between the search keywords. If, for example, users "USR 1" and "USR 2" input keywords "Kwd 1" and "Kwd 2" in a search site for searching contents, the keyword output apparatus 10 brings the keywords "Kwd 1" and "Kwd 2" together to form a keyword cluster because of the relationship between these keywords related to the user searches. In each keyword cluster prepared, each keyword is extracted as a target keyword, a degree of relation between the target keyword and the related keyword related to the target keyword (that is, another keyword in the same cluster) is calculated, and related keywords that are related to the target keyword are stored in the related keyword DB 14c in association with each other according to degrees of relation between each other.

Then, the evaluation expression processing unit 15d of the keyword output apparatus 10 reads the keywords stored in the related keyword DB 14c, extracts evaluation expressions for the keywords from the blog DB 14b, calculates degrees of relation between the target keywords and the evaluation expressions, and stores the evaluation expressions in the evaluation expression DB 14d correspondingly with the degrees of relation between the target keywords and the evaluation expressions (Step S1103).

The co-occurring word processing unit 15e of the keyword output apparatus 10 reads the keywords stored in the related keyword DB 14c, extracts other keywords that appear as co-occurring words with the keywords stored in the blog DB 14b, calculates the numbers of co-occurring articles for the extracted keywords, and stores, for each target keyword, the co-occurring words in the co-occurring word DB 14e correspondingly with the numbers of co-occurring articles (Step S1104).

Figure 13:
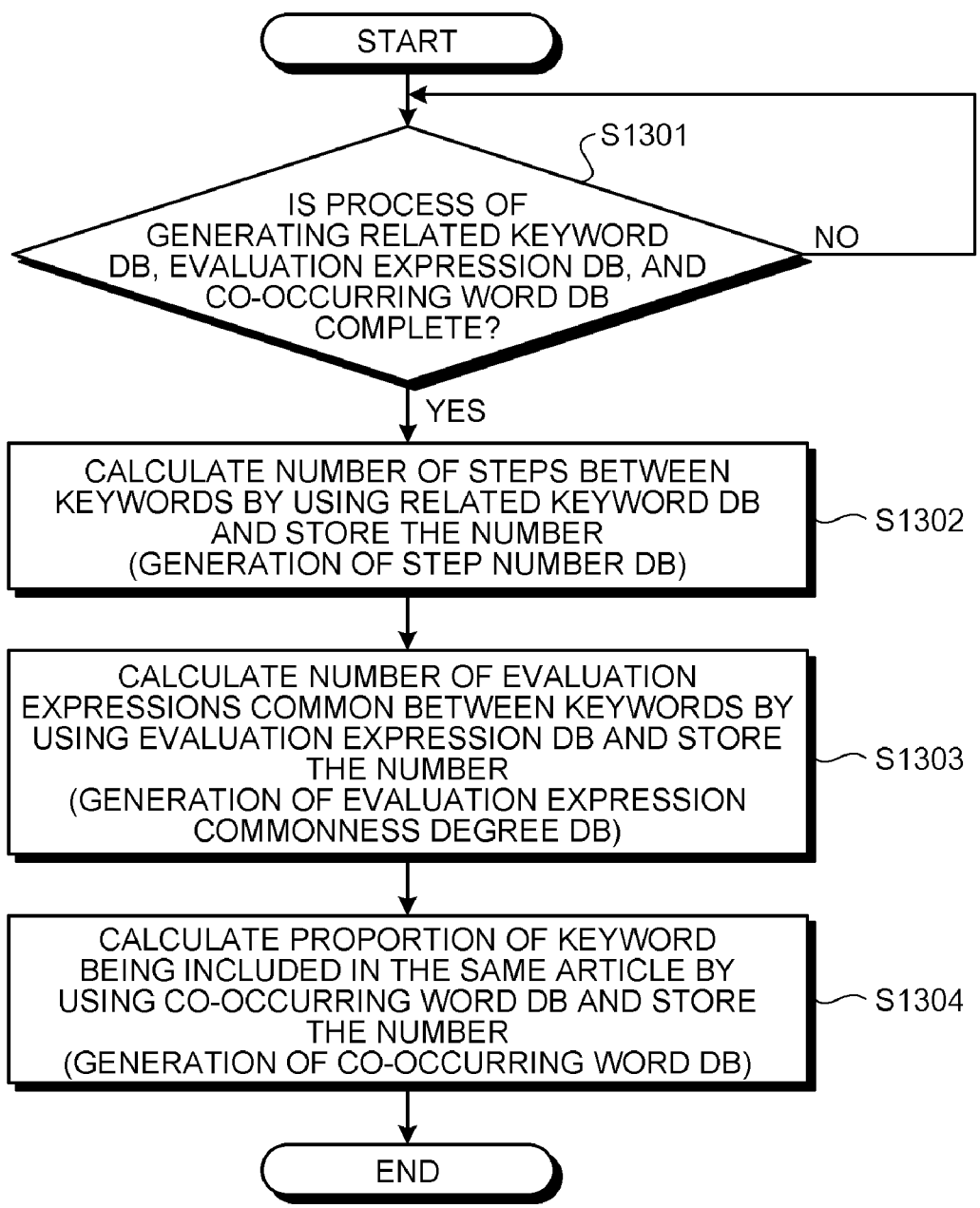
FIG. 13 is a flowchart for generation of the step number DB, the evaluation expression commonness degree DB, and the co-occurrence degree DB performed by the keyword output apparatus.

Generation of Step Number DB, Evaluation Expression Commonness Degree DB, and Co-occurrence Degree DB A process of generating the step number DB 14f, the evaluation expression commonness degree DB 14g, and the co-occurrence degree DB 14h performed by the keyword output apparatus 10 are described below with reference to FIG. 13. FIG. 13 is a flowchart for the process of generating the step number DB 14f, the evaluation expression commonness degree DB 14g, and the co-occurrence degree DB 14h performed by the keyword output apparatus 10.

As illustrated in FIG. 13, the keyword output apparatus 10 determines whether the process of generating the related keyword DB 14c, the evaluation expression DB 14d, and the co-occurring word DB 14e has been completed (Step S1301). If the process of generating the DBs has been completed (YES at Step S1301), the step number calculating unit 15f of the keyword output apparatus 10 calculates the numbers of steps from the target keywords stored in the related keyword DB 14c to the related keywords and then, stores the numbers of steps in the step number DB 14f for each of the keywords (Step S1302).

Then, the evaluation expression commonness degree calculating unit 15g of the keyword output apparatus 10 calculates the numbers of the evaluation expressions commonly included in the keywords stored in the evaluation expression DB 14d, and stores the number of the evaluation expressions in the evaluation expression commonness degree DB 14g, for each of the keywords (Step S1303).

Then, the co-occurrence degree calculating unit 15h of the keyword output apparatus 10 calculates proportions of the keywords appearing in the same article based on the number of appearances of the keywords stored in the co-occurring word DB 14e included in the same blog articles. The co-occurrence degrees calculated are stored in the co-occurrence degree DB 14h for each of the keywords (Step S1304).

Extraction and Layout of Same-Region Keywords

Figure 14:
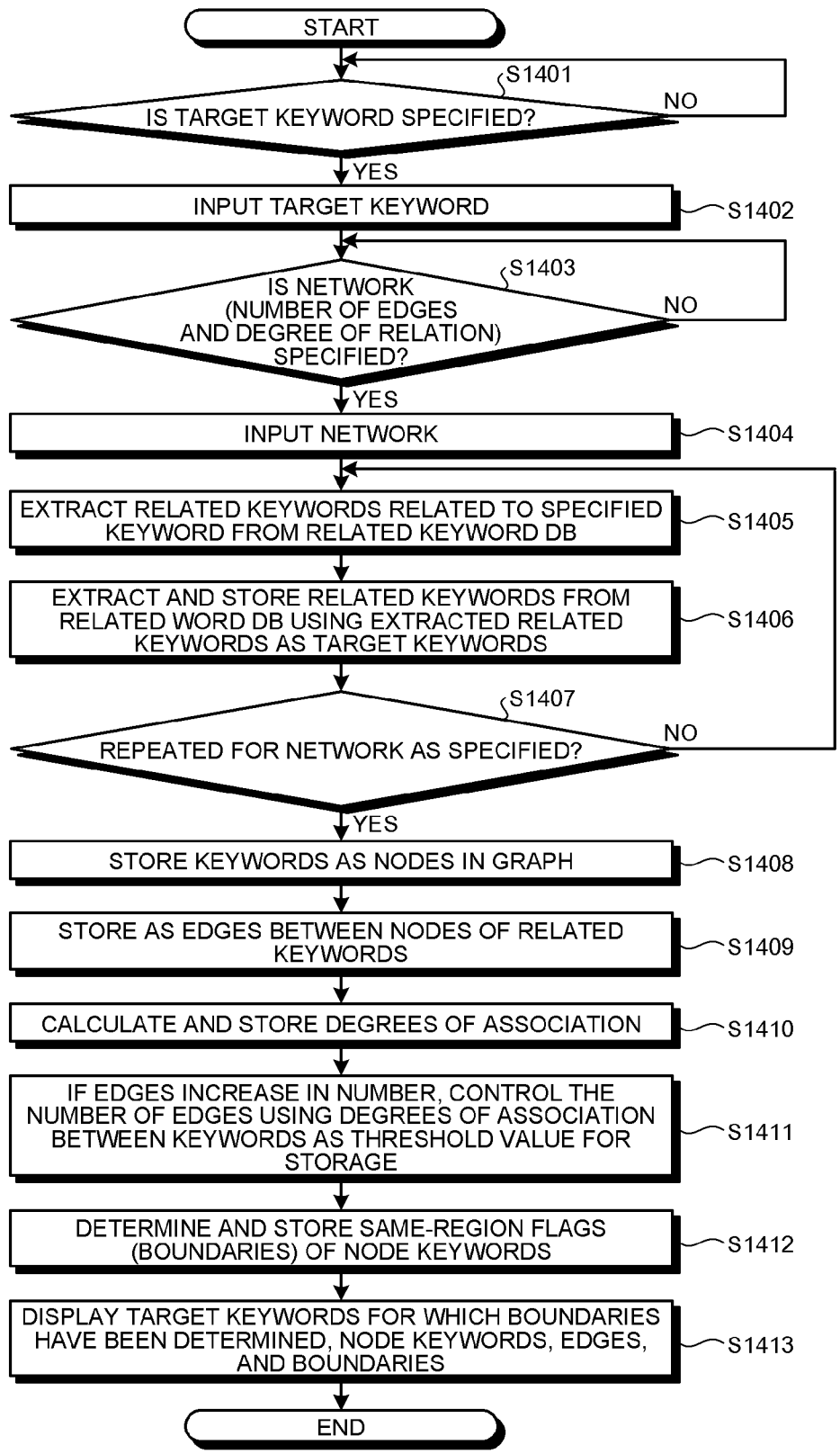
FIG. 14 is a flowchart for extraction of same-region keyword and layout performed by the keyword output apparatus.

A process of extracting and laying out the same-region keywords performed by the keyword output apparatus 10 is described below with reference to FIG. 14. FIG. 14 is a flowchart for the process of extracting and laying out the same-region keywords performed by the keyword output apparatus 10. FIGS. 15A to 15E are diagrams of an example of a progress of the keyword layout process performed by the keyword output apparatus 10.

As illustrated in FIG. 14, the keyword output apparatus 10 determines whether a target keyword is specified via the I/F unit 13 (Step S1401). If a target keyword is specified via the I/F unit 13 (YES at Step S1401), the keyword output apparatus 10 inputs the target keyword received (Step S1402).

Then, the keyword output apparatus 10 determines whether a network (the number of edges, degree of relation, and the like) is specified via the I/F unit 13 (Step S1403). If a network is specified via the I/F unit 13 (YES at Step S1403), the keyword output apparatus 10 inputs the received network (Step S1404). Specifying the number of edges for the network is specifying how many nodes from the target keyword are to be displayed as an output. Specifying the degree of relation for the network is for extracting a node having a degree of relation between the target keyword and the related keyword greater than a predetermined value from the related keyword DB 14c. Specifying the network may include specifying for a plurality of related keywords related to the target keyword how many of the related keywords with the top degrees of association are displayed as an output.

Then, the keyword output apparatus 10 extracts related keywords that are related to the target keyword specified (input) at Step S1402 from the keywords stored in the related keyword DB 14c (Step S1405). For example, if "0.5" is input as a degree of relation at Step S1403, related keywords having a degree of relation equal to or greater than "0.5" with respect to the specified target keyword are extracted from the related keywords stored in the related keyword DB 14c.

The keyword output apparatus 10 extracts related keywords from the related keyword DB 14c using the related keywords extracted as target keywords, and stores the related keywords in the keyword layout drawing DB 14i (Step S1406). For example, if three related keywords are extracted, the three related keywords are used as target keywords. For each of the target keywords, related keywords satisfying the above degree of relation are extracted and stored in the keyword layout drawing DB 14i.

Then, the keyword output apparatus 10 determines whether the process described above has been repeated for the specified network (for example, for the specified number of edges) (Step S1407). For example, if "2" is input as the number of edges at Step S1404, the above process is repeated twice.

Figure 15A:
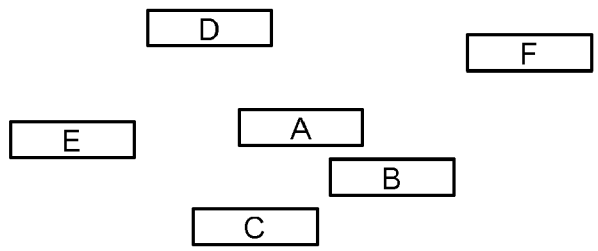
FIGS. 15A to 15E are diagrams of an example of a progress of a keyword layout process performed by the keyword output apparatus.

If the keyword output apparatus 10 determines that the process has been repeated for the specified network (YES at Step S1407), as illustrated in FIG. 15A, the related keywords related to the target keywords (that is, the keywords extracted at Steps S1405 and S1406) are stored in the keyword layout drawing DB 14i as graph nodes (Step S1408).

Figure 15B:
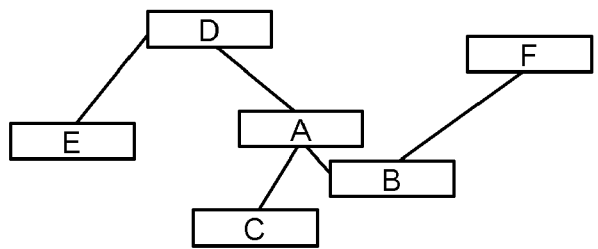
Figure 15C:
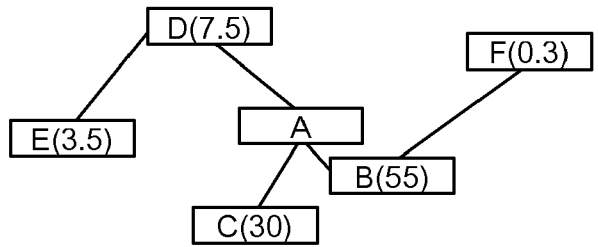
Figure 15D:
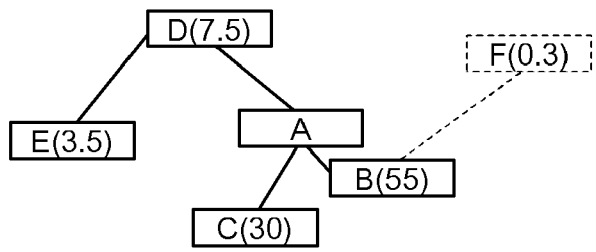

Then, as illustrated in FIG. 15B, the keyword output apparatus 10 stores one or more of the connecting sources and the connecting destinations between keywords in the keyword layout drawing DB 14i as edges between nodes of keywords related to the target keyword (Step S1409). Then, as illustrated in FIG. 15C, the degree-of-association calculating unit 15i calculates degrees of association between keywords, and stores the calculated degrees of association in the keyword layout drawing DB 14i (Step S1410). As illustrated in FIG. 15D, if the number of edges increases, the keyword layout drawing processing unit 15k controls the number of edges by using, for example, a degree of association as a threshold value, and then, stores the number of the edges in the keyword layout drawing DB 14i (Step S1411).

Figure 15E:
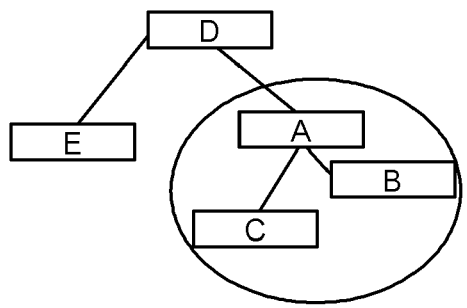

As illustrated in FIG. 15E, the same-region keyword extracting unit 15j determines whether degrees of association are larger than a predetermined value, and a flag at "1" is set for related keywords included in the same region and a flag at "0" is set for related keywords that are not included in the same region, thereby defining a boundary. Then, the boundary is stored in the keyword layout drawing DB 14i (Step S1412).

Figure 16:
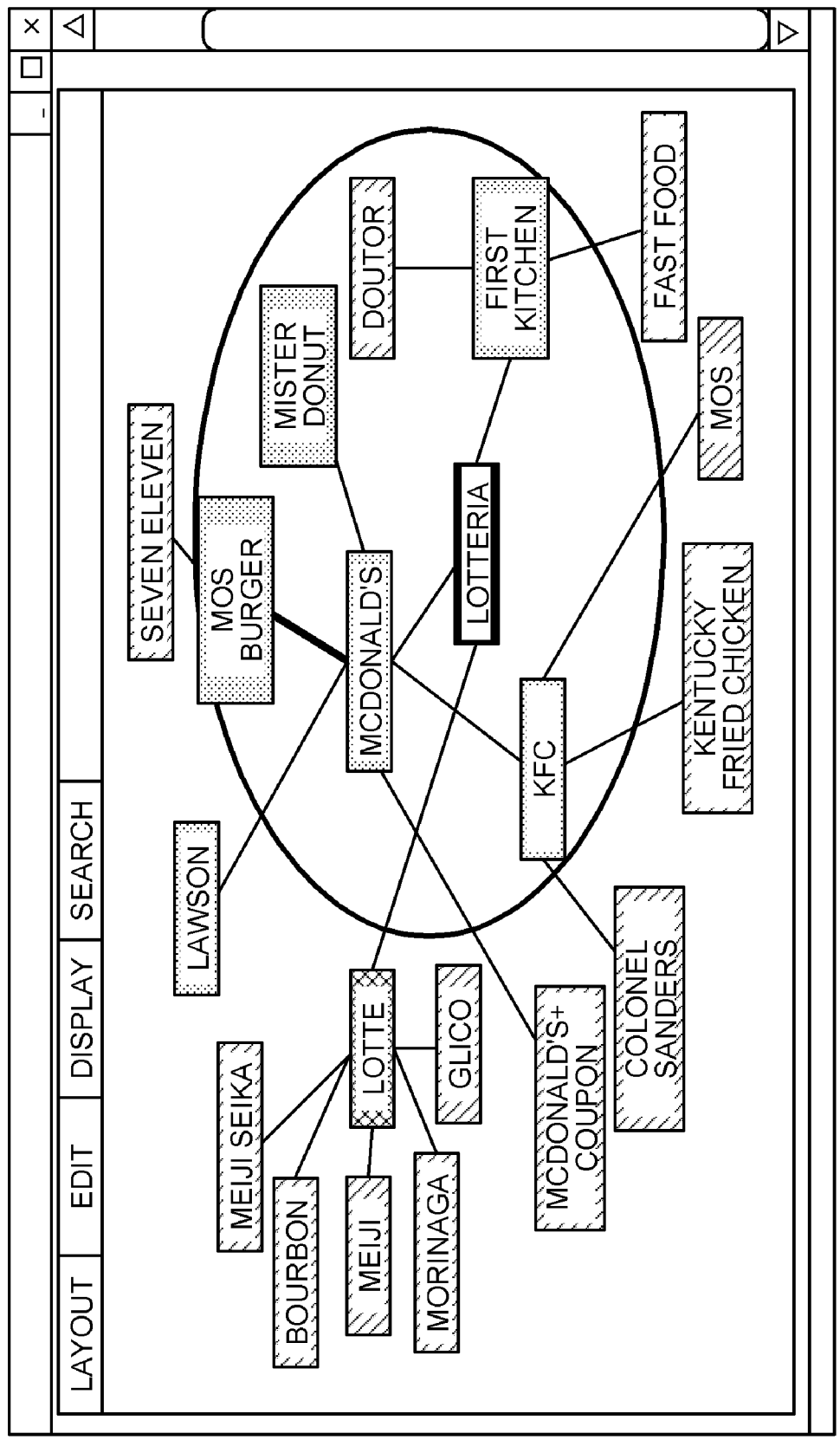
FIG. 16 is a diagram of an example of a result of the keyword layout process performed by the keyword output apparatus.

Then, the keyword layout drawing processing unit 15k displays as an output the target keywords for which the boundaries have been defined, node keywords, edges and boundaries through a predetermined output unit (Step S1413). For example, as illustrated in FIG. 16, for a target keyword a boundary line that surrounds same-region keywords included in the same boundary as the target keyword is drawn. Differences in degrees of association may be represented by oblique lines and different colors with respect to the target keywords and the nodes. Differences in degrees of association between nodes may also be represented by different widths of edges between the nodes.

Effects of First Embodiment

Thus, when the keyword output apparatus 10 according to the first embodiment provides a network presentation of a plurality of keywords related to each other, an accurate boundary that is defined by an evaluation viewpoint of the user from the target keyword is clarified, thereby making overlooking of a whole relationship possible.

Moreover, according to the first embodiment, the keyword output apparatus 10 also takes co-occurrence degrees in account. Therefore, a more accurate boundary is clarified.

[b] Second Embodiment

In the first embodiment, when a keyword layout drawing in which a target keyword and a plurality of related keywords are arranged according to degrees of association between each other, one target keyword is specified. The present invention is not, however, limited thereto. A plurality of target keywords may be specified. In the present invention, evaluation expressions of the keywords may also be output as well as the keywords.

Thus, in a second embodiment of the present invention below, a plurality of target keywords are specified and evaluation expressions are also output. A configuration and functions of the keyword output apparatus 10 are similar to those in the first embodiment. A keyword output process according to the second embodiment is described below with reference to FIGS. 17 to 19.

Same-Region Keyword Extraction and Layout by Keyword Output Apparatus

Figure 17:
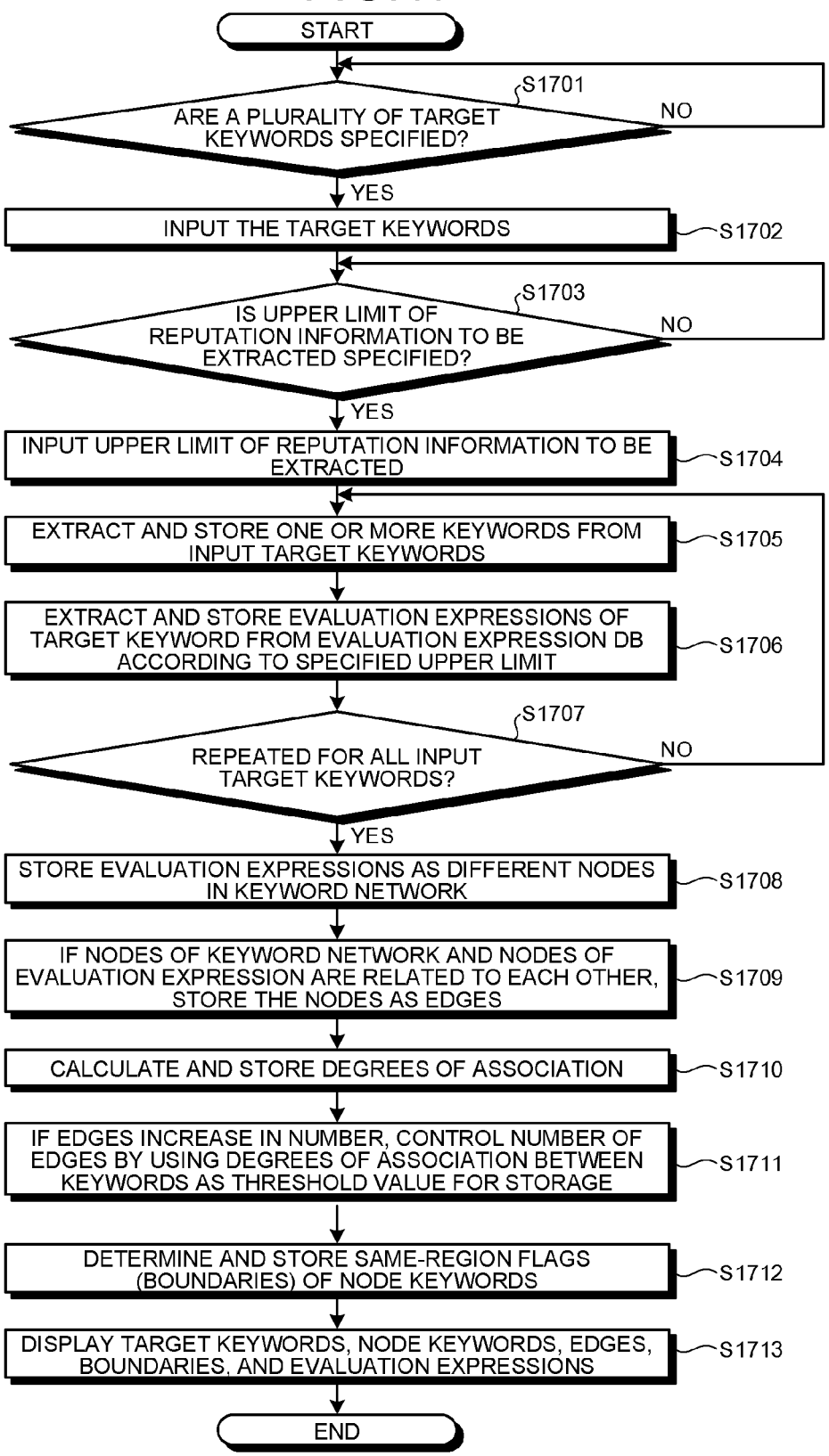
FIG. 17 is a flowchart of a same-region keyword extracting process and a same-region keyword layout process performed by the keyword output apparatus.
Figure 18:
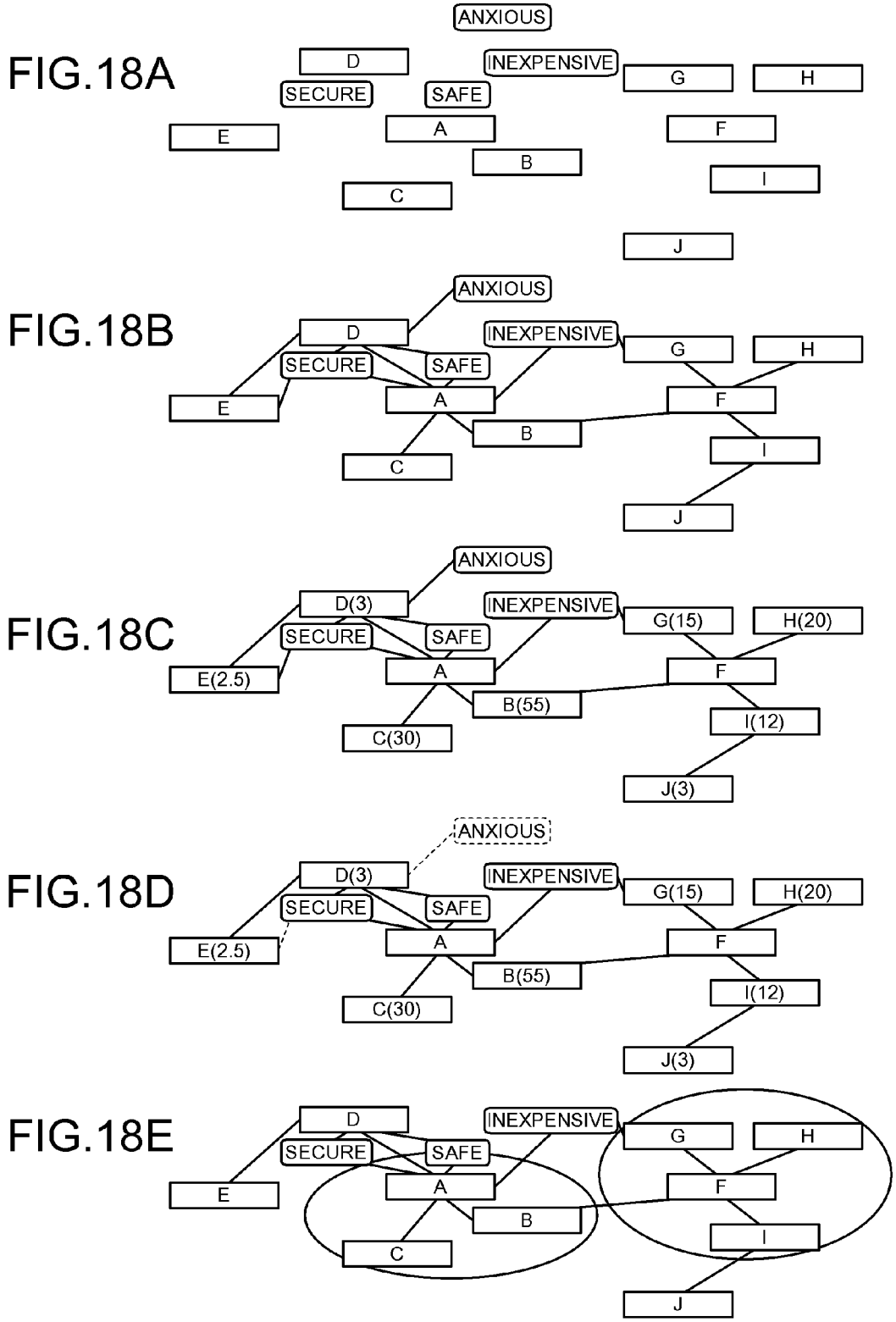
FIGS. 18A to 18E are diagrams of an example of a progress of the keyword layout process and the evaluation expression layout process performed by the keyword output apparatus.

Same-region keyword extracting and layout processes performed by the keyword output apparatus 10 are described with reference to FIG. 17. FIG. 17 is a flowchart for same-region keyword extracting and layout processes performed by the keyword output apparatus 10. FIGS. 18A to 18E are diagrams of an example of a progress of the keyword and evaluation expression layout processes performed by the keyword output apparatus 10.

As illustrated in FIG. 17, the keyword output apparatus 10 determines whether a plurality of target keywords have been specified via the I/F unit 13 (Step S1701). If the target keywords have been specified via the I/F unit 13 (YES at Step S1701), the keyword output apparatus 10 inputs therein the target keywords received thereby (Step S1702).

Then, the keyword output apparatus 10 determines whether an upper limit for reputation information to be extracted (for example, how many of the top items or a degree of relation) has been specified via the I/F unit 13 (Step S1703). If the upper limit for the reputation information has been specified via the I/F unit 13 (YES at Step S1703), the keyword output apparatus 10 inputs therein the upper limit for the reputation information received (Step S1704).

Then, the keyword output apparatus 10 extracts one or more related keywords related to the target keywords input thereby and stores the related keywords in the keyword layout drawing DB 14i (Step S1705), extracts evaluation expressions of the target keywords according to the upper limit by using the evaluation expression DB 14d, and stores the evaluation expressions in the keyword layout drawing DB 14i (Step S1706). Related keywords may be extracted according to the number of edges or degree of relation specified as in the first embodiment.

Then, the keyword output apparatus 10 determines whether Steps S1705 and S1706 have been repeated for each of the target keywords input (Step S1707). If the processes have been repeated as many times as the number of the specified keywords (YES at Step S1707), as illustrated in FIG. 18A, the keyword output apparatus 10 stores the related keywords and the evaluation expressions thus extracted in the keyword layout drawing DB 14i as different nodes of a keyword network (Step S1708).

As illustrated in FIG. 18B, if nodes of keyword network and nodes of evaluation expressions are related, the keyword output apparatus 10 stores the relationship as edges in the keyword layout drawing DB 14*i* (Step S1709). As illustrated in FIG. 18C, the degree-of-association calculating unit 15*i* of the keyword output apparatus 10 calculates degrees of association between keywords, and stores the degrees of association calculated in the keyword layout drawing DB 14*i* (Step S1710). Then, as illustrated in FIG. 18D, if the number of edges increases, the keyword output apparatus 10 controls the number of edges by using the degrees of association between keywords as a threshold value, and then, stores the number of edges in the keyword layout drawing DB 14*i* (Step S1711).

As illustrated in FIG. 18E, the same-region keyword extracting unit 15*j* of the keyword output apparatus 10 determines whether degrees of association are larger than a predetermined value. A flag at "1" is set for the related keywords included in the same region, and a flag at "0" is set for the related keyword not included in the same region, thereby defining a boundary. Then, the boundary is stored in the keyword layout drawing DB 14*i* (Step S1712).

Figure 19:
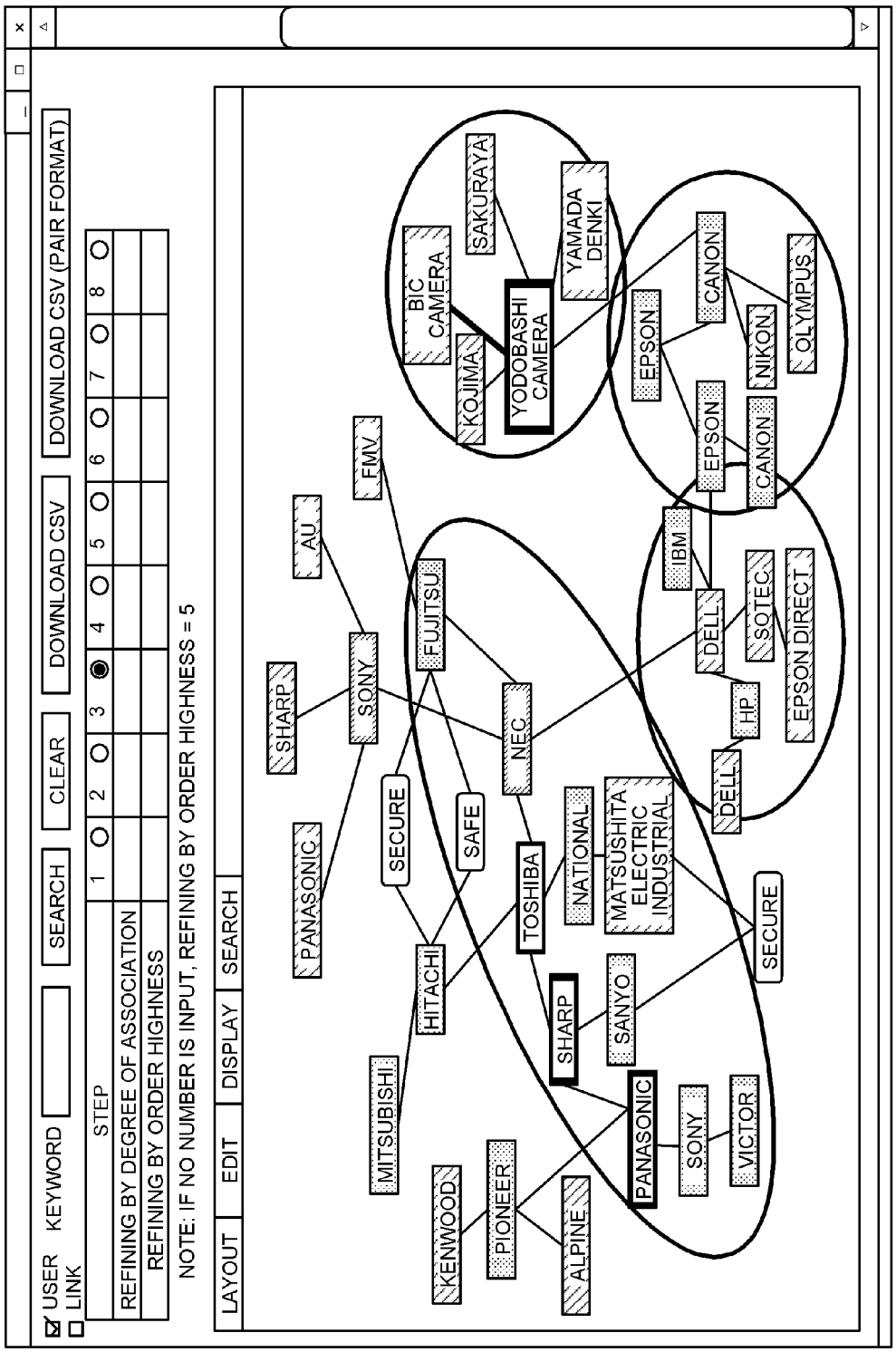
FIG. 19 is a diagram of an example of a result of the keyword layout process and the evaluation expression layout process performed by the keyword output apparatus.

The keyword layout drawing processing unit 15*k* outputs and displays the target keywords, the node keywords, the edges, the boundaries, and the evaluation expressions through a predetermined output unit (Step S1713). For example, as illustrated in FIG. 19, a plurality of boundary lines are drawn for the target keywords that surround the same-region keywords that are included in the same boundary. Different degrees of association may be represented by oblique lines and different colors with respect to the nodes including the target keywords and the evaluation expressions. Different degrees of association between the nodes may also be represented by different widths of edges between the nodes.

Effects of Second Embodiment

In the keyword output apparatus 10 according to the second embodiment, even if a plurality of target keywords are involved, overlooking of the whole relationship between a plurality of business circles are possible. As evaluation expressions are visualized, relationships between the business circles are more accurately understood.

[c] Third Embodiment

Exemplary embodiments of the present invention have been described above. The present invention is, however, not limited thereto, and may be implemented in various other embodiments besides the above embodiments. Thus, other different embodiments are individually described below.

Configuration of the Keyword Output Apparatus

In the first embodiment, the keyword output apparatus 10 uses search logs of search sites and blog data of blog sites to obtain keywords and evaluation expressions. The present invention is, however, not limited thereto. The keyword output apparatus 10 may use, for example, Web contents from which keywords and evaluation expressions can be obtained such as news boards and bulletin boards of Web contents.

In the first embodiment, the step number DB 14*f*, the evaluation expression commonness degree DB 14*g*, and the co-occurrence degree DB 14*h* are prepared before receiving a target keyword. The present invention is not, however, limited thereto, and for example, each time when a degree of association is calculated, the number of steps, the number of evaluation expressions, and co-occurrence degrees may be calculated so that the number of steps, the number of evaluation expressions, and the co-occurrence degrees may not be prepared in advance.

In the first embodiment, a degree of association is calculated by using the number of steps, the number of evaluation expressions, and the co-occurrence degrees. The present invention is not, however, limited thereto, and, for example, a degree of association may be calculated with out a co-occurrence degree and be calculated by using only the number of steps and the number of evaluation expressions.

System Configuration

Information such as processing procedures, control procedures, specific names, various data and parameters described above and in accompanying drawings (for example, "target keyword" illustrated in FIG. 4) may be arbitrarily modified unless otherwise stated.

Respective configuration elements of the respective illustrated devices illustrated in the drawings are functionally conceptual and are not always physically configured as illustrated. Specifically, a specific pattern into which the devices are dispersed or integrated is not limited to the illustrated pattern. The devices may be configured by functionally or physically dispersing or integrating all or some of the devices on any unit according to various loads or usages. For example the search log DB 14*a* and the blog DB 14*b* may be integrated into a search site DB. All or some of the processing functions may be implemented by a CPU or a computer program that is analyzed and executed by the CPU, or by wired-logic hardware.

Keyword Output Program

Figure 20:
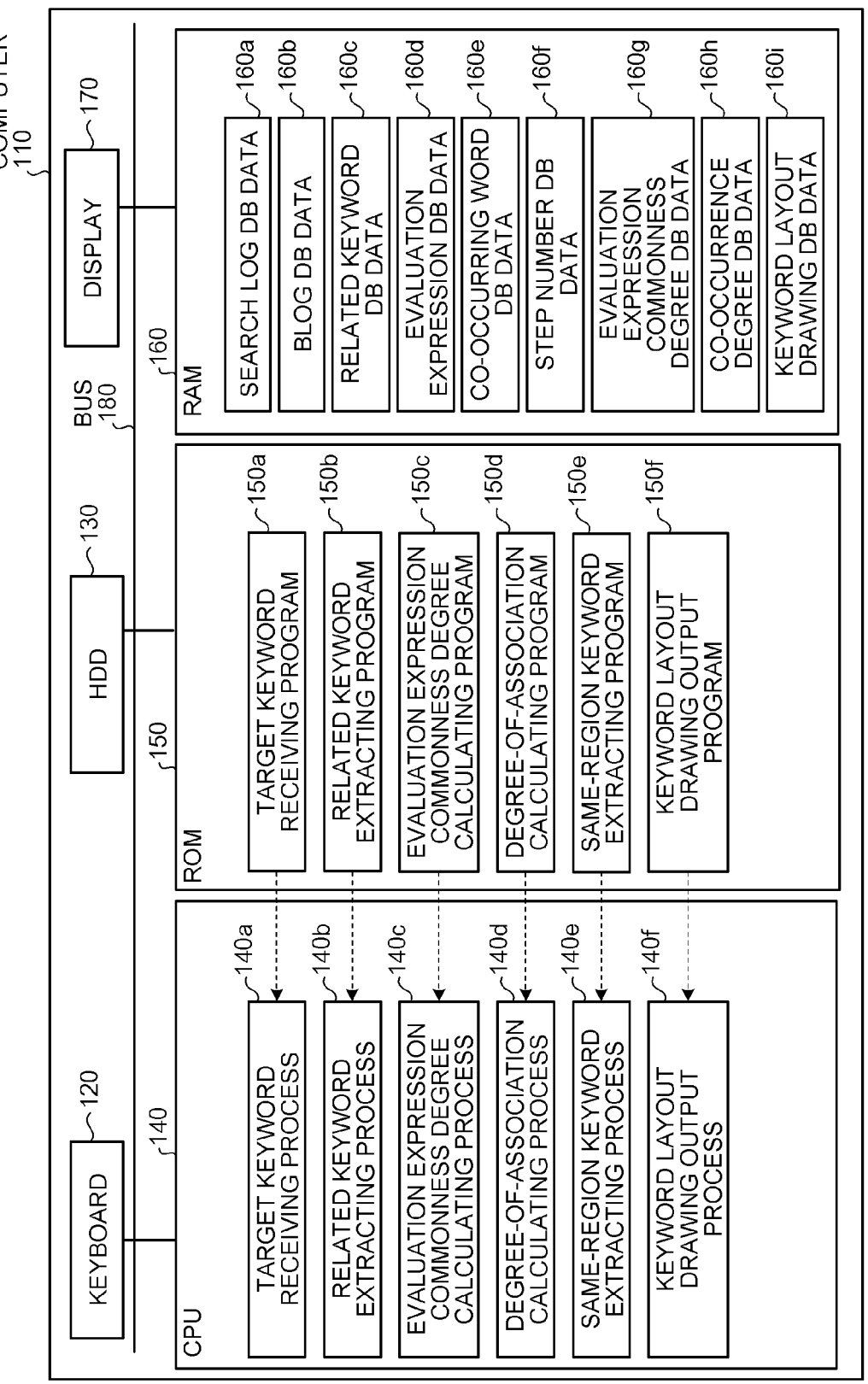
FIG. 20 is a diagram of an example of a computer that executes a keyword output program.

The keyword output apparatus described in the embodiments above may be configured by executing a computer program prepared in advance on a computer such as a personal computer and a workstation. An example of a computer that executes a keyword output program having the functions similar to that of the keyword output apparatus according to the embodiments is described below with reference to FIG. 20. FIG. 20 is a diagram of an example of a computer that executes a keyword output program.

As illustrated in FIG. 20, a computer 110 as a directory hierarchy generating device includes a keyboard 120, a hard disk drive (HDD) 130, a central processing unit (CPU) 140, a read only memory (ROM) 150, a random access memory (RAM) 160, and a display 170 so that the keyboard 120, the HDD 130, the CPU 140, the ROM 150, the RAM 160, and the display 170 connected to each other via a bus 180.

As illustrated in FIG. 20, the ROM 150 stores therein in advance, keyword output programs having the functions similar to the keyword output apparatus 10 according to the first embodiment, that is, a target keyword receiving program 150*a*, a related keyword extracting program 150*b*, an evaluation expression commonness degree calculating program 150*c*, a degree-of-association calculating program 150*d*, a same-region keyword extracting program 150*e*, and a keyword layout drawing output program 150*f*. The computer programs 150*a* to 150*f* may be integrated and dispersed as required, as with the components of the keyword output apparatus illustrated in FIG. 2.

As illustrated in FIG. 20, when the CPU 140 reads the computer programs 150*a* to 150*f* from the ROM 150 and executes the computer programs 150*a* to 150*f*, the computer programs 150*a* to 150*f*, respectively, functions as a target keyword receiving process 140*a*, a related keyword extracting process 140*b*, an evaluation expression commonness degree calculating process 140*c*, a degree-of-association calculating process 140*d*, a same-region keyword extracting process 140*e*, and a keyword layout drawing output process 140*f*. The processes 140*a* to 140*f* correspond to the control unit 15, the related keyword processing unit 15*c*, the evaluation expression commonness degree calculating unit 15*g*, the degree-of association calculating unit 15*i*, the same-region keyword extracting unit 15*j*, and the keyword layout drawing processing unit 15*k*, respectively, as illustrated in FIG. 2.

The CPU 140 executes the keyword output program according to a search log DB data 160*a*, a blog DB data 160*b*, a related keyword DB data 160*c*, an evaluation expression DB data 160*d*, a co-occurring word DB data 160*e*, a step number DB data 160*f*, an evaluation expression commonness degree DB data 160*g*, a co-occurrence degree DB data 160*h*, and a keyword layout drawing DB data 160*i* that are recorded in the RAM 160.

The computer programs 150*a* to 150*f* are not necessarily stored in the ROM 150 in advance. For example, the computer programs 150*a* to 150*f* may be stored in "portable physical media" such as a flexible disk (FD), a CD-ROM, a DVD disk, an optical magnetic disk, an IC card that can be inserted to the computer 110, "fixed physical media" such as a HDD provided inside or outside of the computer 110, and "other computers or servers" connected to the computer 110 via a public line, the Internet, a LAN, and a WAN, and the computer 110 may read and execute the computer programs 150*a* to 150*f*.

According to an aspect of the present invention, an accurate boundary that is defined by an evaluation view of the user can be clearly specified from the target keyword, thereby making overlooking of a whole relationship possible.

According to another aspect of the present invention, a more accurate boundary can be clearly specified.

According to yet another aspect of the present invention, a whole relationship in a plurality of business fields can be overlooked.

According to still another aspect of the present invention, relationship between the business fields can be more accurately understood.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer readable storage medium having stored therein a keyword output program causing a computer to execute a keyword output method comprising:

receiving a target keyword from a predetermined input unit;

extracting, from a keyword storage unit that stores a plurality of keywords in association with each other according to degrees of relation among each other, a plurality of related keywords that have degrees of relation equal to or greater than a predetermined degree of relation with respect to the target keyword received, the stored plurality of keywords having been used for a search at a search site for searching contents;

reading evaluation expressions corresponding to the target keyword and the plurality of related keywords from an evaluation expression storage unit that stores evaluation expressions correspondingly with each of the plurality of keywords stored in the keyword storage unit, each evaluation expression having been extracted from a content containing the corresponding keyword, and calculating for each of the plurality of related keywords a commonness degree between the evaluation expressions corresponding to the related keyword and the evaluation expressions corresponding to the target keyword;

calculating for each of the plurality of related keywords a degree of association between the related keyword and the target keyword by using a distance derived from the keyword storage unit for each of the plurality of related keywords with respect to the target keyword and the commonness degree of the evaluation expressions calculated for each of the plurality of related keywords;

determining whether the degree of association calculated is greater than a predetermined degree of association and extracting a first related keyword having a degree of association greater than the predetermined degree of association from among the plurality of related keywords; and outputting a keyword layout drawing including the target keyword and the plurality of related keywords arranged according to the degrees of association between each other through a predetermined output unit such that the the first related keyword is displayed distinguishably from other related keyword.

2. The computer readable storage medium according to claim 1, wherein the keyword output program further causes the computer to execute:

reading, from a co-occurring word storage unit that stores numbers of co-occurring articles with respect to other keywords that appear together with a corresponding keyword as co-occurring words in a same content correspondingly with each of the plurality of keywords stored in the keyword storage unit, the numbers of co-occurring articles corresponding to the target keyword and the plurality of related keywords, and calculating a co-occurrence degree for each of the plurality of related keywords that indicates a proportion of the related keyword appearing in the same content as the target keyword, and calculating the degree of association using the co-occurrence degree calculated for each of the plurality of related keywords in addition to the distance and the commonness degree.

3. The computer readable storage medium according to claim 1, wherein a plurality of target keywords are received, the plurality of related keywords are extracted for each of the plurality of target keywords, the commonness degree for each of the plurality of related keywords for each of the target keywords is calculated, the degree of association for each of the plurality of related keywords for each of the plurality of target keywords is calculated, the first related keyword for each of the plurality of target keywords is extracted, and the output keyword layout drawing includes the plurality of target keywords and the plurality of related keywords arranged according to the degrees of association between each other such that the first related keyword for each of the plurality of target keywords is displayed distinguishably from the other related keyword.

4. The computer readable storage medium according to claim 1, wherein the evaluation expressions that are common between the keywords are read from the evaluation expression storage unit, and the common evaluation expressions are output superposed on the keyword layout drawing.

5. The computer readable storage medium according to claim 1, wherein the outputting outputs the keyword layout drawing displaying the first related keyword distinguishably from the other related keyword by indicating
- (a) a boundary line surrounding all the first related keyword,
- (b) each keyword in a different color,
- (c) each keyword in a different shape, or
- (d) any combination thereof.

6. A keyword output apparatus comprising:
a keyword storage unit that stores therein a plurality of keywords in association with each other according to degrees of relation among each other, the plurality of keywords having been used for a search at a search site for searching contents;
an evaluation expression storage unit that stores evaluation expressions correspondingly with each of the plurality of keywords stored in the keyword storage unit, each evaluation expression having been extracted from a content containing the corresponding keyword;
a target keyword receiving unit that receives a target keyword from a predetermined input unit;
a related keyword extracting unit that extracts from the keywords stored in the keyword storage unit a plurality of related keywords that have degrees of relation equal to or greater than a predetermined degree of relation with respect to the target keyword received by the target keyword receiving unit;
an evaluation expression commonness degree calculating unit that reads evaluation expressions corresponding to the target keyword and the plurality of related keywords from the evaluation expressions stored in the evaluation expression storage unit, and calculates for each of the plurality of related keywords a commonness degree between the evaluation expressions corresponding to the related keyword and the evaluation expressions corresponding to the target keyword;
a degree-of-association calculating unit that calculates for each of the plurality of related keywords a degree of association between the related keyword and the target keyword by using a distance derived from the keyword storage unit for each of the plurality of related keywords with respect to the target keyword and the commonness degree of the evaluation expressions calculated for each of the plurality of related keywords by the evaluation expression commonness degree calculating unit;
a first related keyword extracting unit that determines whether the degree of association calculated by the degree of association calculating unit is greater than a predetermined degree of association, and extracts a first related keyword having a degree of association greater than the predetermined degree of association; and
a keyword layout drawing output unit that outputs a keyword layout drawing including the target keyword and the plurality of related keywords arranged according to the degrees of association between each other through a predetermined output unit such that the first related keyword extracted by the first related keyword extracting unit is displayed distinguishably from other related keyword.

7. A keyword output method comprising:
receiving a target keyword from a predetermined input unit;
extracting, from a keyword storage unit that stores a plurality of keywords in association with each other according to degrees of relation among each other, a plurality of related keywords that have degrees of relation equal to or greater than a predetermined degree of relation with respect to the target keyword received, the stored plurality of keywords having been used for a search at a search site for searching contents;
reading evaluation expressions corresponding to the target keyword and the plurality of related keywords from an evaluation expression storage unit that stores evaluation expressions correspondingly with each of the plurality of keywords stored in the keyword storage unit, each evaluation expression having been extracted from a content containing the corresponding keyword, and calculating for each of the plurality of related keywords a commonness degree between the evaluation expressions corresponding to the related keyword and the evaluation expressions corresponding to the target keyword;
calculating for each of the plurality of related keywords a degree of association between the related keyword and the target keyword by using a distance derived from the keyword storage unit for each of the plurality of related keywords with respect to the target keyword and the commonness degree of the evaluation expressions calculated for each of the plurality of related keywords;
determining whether the degree of association calculated is greater than a predetermined degree of association and extracting a first related keyword having a degree of association greater than the predetermined degree of association; and
outputting a keyword layout drawing including the target keyword and the plurality of related keywords arranged according to the degrees of association between each other through a predetermined output unit such that the first related keyword is displayed distinguishably from other related keyword.

* * * * *